United States Patent
Yamamoto

(10) Patent No.: US 6,987,345 B2
(45) Date of Patent: Jan. 17, 2006

(54) VIBRATION TYPE ACTUATOR DRIVE CONTROLLER AND METHOD OF CONTROLLING DRIVE SPEED OF VIBRATION TYPE ACTUATOR

(75) Inventor: Shinji Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/927,021

(22) Filed: Aug. 27, 2004

(65) Prior Publication Data

US 2005/0046363 A1 Mar. 3, 2005

(30) Foreign Application Priority Data

Sep. 1, 2003 (JP) ............................. 2003-309245
Jul. 2, 2004 (JP) ............................. 2004-196912

(51) Int. Cl.
*H02N 2/00* (2006.01)
(52) U.S. Cl. .................. 310/316.01; 318/114; 310/317
(58) Field of Classification Search ........... 310/316.01, 310/317; 318/114, 460
See application file for complete search history.

(56) References Cited

U.S. PATENT DOCUMENTS 4,954,741 A * 9/1990 Furutsu et al. ......... 310/316.02
5,644,199 A * 7/1997 Nojima et al. ............... 318/114
5,889,350 A * 3/1999 Yamamoto ............. 310/316.01
6,054,795 A * 4/2000 Yamamoto et al. .... 310/316.01
6,215,224 B1 * 4/2001 Kataoka et al. ........ 310/316.02
6,376,965 B1 * 4/2002 Kataoka et al. ............. 310/317
6,411,008 B1 * 6/2002 Otsubo et al. ......... 310/316.01
6,635,977 B2 * 10/2003 Kataoka et al. ............. 310/116

FOREIGN PATENT DOCUMENTS

JP 06269182 A * 9/1994

* cited by examiner

*Primary Examiner*—Burton Mullins
(74) *Attorney, Agent, or Firm*—Fitzpatrick, Cella, Harper & Scinto

(57) ABSTRACT

This disclosure relates to a technique for smoothly carrying out an acceleration operation and a deceleration operation for a vibration type actuator to prevent a situation where in starting the vibration type actuator, a drive frequency is reduced to become lower than a resonance frequency to stop the vibration type actuator. A first counter performs up-count from a first value to a second value larger than the first value at predetermined time intervals in accelerating the vibration type actuator. A rate multiplier outputs a clock signal having a frequency corresponding to the count value. A second counter measures a period of a pulse signal, the period being adapted to change in correspondence to a drive speed of the vibration type actuator, by counting the clock pulses. The drive speed of the vibration type actuator is controlled such that the measured pulse period becomes a predetermined target value.

17 Claims, 5 Drawing Sheets

VIBRATION TYPE ACTUATOR DRIVE CONTROLLER AND METHOD OF CONTROLLING DRIVE SPEED OF VIBRATION TYPE ACTUATOR

BACKGROUND OF THE INVENTION

1. Field of the Invention

The present invention relates in general to a vibration type actuator drive controller, and more particularly to a vibration type actuator drive controller and a method of controlling a drive speed of a vibration type actuator adapted to excite a vibration member by applying an A.C. signal to an electromechanical energy transducer to obtain a driving force.

2. Related Background Art

In a vibration type actuator adapted to excite a vibration member by applying an A.C. signal to an electromechanical energy transducer to obtain a driving force, heretofore, various proposals have been made for an acceleration/deceleration method for a vibration type motor which is one of vibration type actuators.

For example, Japanese Patent Application Laid-Open No. H06-269182 discloses a technique in which to stably accelerate and decelerate a vibration type motor, characteristics of the vibration type motor, especially, gradients of a drive speed with respect to a drive frequency of the vibration type motor are learnt in advance, and an operation for updating the drive frequency is repeatedly carried out as may be necessary by utilizing the gradients thus learnt. Thus, the smooth and stable control for start and stop of the vibration type motor can be conducted irrespective of the fluctuation in characteristics.

U.S. Pat. No. 5,644,199 also discloses a technique in which to drive a vibration type motor stably and efficiently in starting and stopping the vibration type motor without generating an abnormal sound and vibrations, a frequency of an A.C. voltage to be applied to a vibration member is variably controlled in a region of a frequency higher than a resonance frequency of the vibration member (in a region where a gradient of a drive speed with respect to the drive frequency is negative), and in starting the vibration type motor, the frequency of the A.C. voltage applied to the vibration member is swept from a high frequency to a low frequency in the frequency region concerned to accelerate the vibration type motor. Then, in decelerating the vibration type motor to stop the vibration type motor, the frequency of the A.C. voltage applied to the vibration member is swept from the frequency at that time to a high frequency in the frequency region concerned to gradually decrease the motor drive speed to stop the motor.

Moreover, with this technique, in a controller for the vibration type motor which is configured so that a speed of the vibration type motor becomes a predetermined value in accordance with speed feedback control, in starting the vibration type motor, a target speed data of which is sent from a microcomputer or the like to the controller is gradually increased for acceleration, and in stopping the vibration type motor, the target speed is gradually decreased for deceleration to thereby prevent an abnormal sound from being generated in stopping as well as in starting the vibration type motor. Further, a drive frequency may undergo the feedback control in a state where the drive frequency is made lower than a resonance frequency of a vibration member due to a start delay resulting from a mechanical time constant of a system having the vibration type motor and a load to which the vibration type motor is connected, and as a result, the vibration type motor may be stopped in some cases. However, such a situation is prevented in the above-mentioned vibration type motor controller.

In the invention disclosed in Japanese Patent Application. Laid-Open No. H06-269182, however, a preliminary operation is required since the gradients of the drive speed with respect to the drive frequency must be learnt in advance. Also, since the stored gradient information strictly changes if there is a fluctuation in environmental conditions such as a temperature, it is difficult to carry out an acceleration operation usually under the same progress. In particular, in an apparatus which is configured so that a vibration type motor and another actuator operate in conjunction with each other, there is a possibility that an operational difference may be generated therebetween and hence nonconformity may be generated in an operation of the apparatus. Moreover, there is encountered a problem that since means for storing information of gradients is required, the apparatus becomes expensive, and so forth.

In addition, in the invention disclosed in U.S. Pat. No. 5,644,199, since the frequency of the A.C. voltage to be applied to the vibration type motor is swept without detecting a drive speed of the vibration type motor, a difference is generated in the acceleration operation due to a fluctuation in environmental conditions such as a temperature or in a load state. Thus, similarly to the above-mentioned problem associated with the invention disclosed in Japanese Patent Application Laid-Open No. H06-269182, there is a possibility that nonconformity may be generated in an apparatus which is configured so that the vibration type motor and another actuator operate in conjunction with each other.

Moreover, in the above-mentioned conventional method of gradually changing the target speed the data of which is sent from the microcomputer or the like to the controller, since the microcomputer operates in accordance with a software, a high speed timing at which the data of the target speed is sent can not be made. For this reason, the acceleration operation and the deceleration operation can not be smoothly carried out. In addition, there is also encountered a problem that the control circuit is expensive.

SUMMARY OF THE INVENTION

The present invention has been made in the light of the above-mentioned problems, and it is, therefore, an object of the present invention to provide a vibration type actuator drive controller which is capable of smoothly carrying out an acceleration operation and a deceleration operation of a vibration type actuator, and which is also capable of preventing such a situation that in starting the vibration type actuator, a drive frequency becomes lower than a resonance frequency to stop an operation of the vibration type actuator.

It is another object of the present invention to provide a vibration type actuator drive controller which is capable of, when a vibration type actuator operates in conjunction with another actuator, reducing a difference in speed between the actuators.

Accordingly, it is an object of the present invention to provide a vibration type actuator drive controller, or a method of controlling a vibration type actuator which is capable of smoothly carrying out an acceleration operation and a deceleration operation of a vibration type actuator, and which is also capable of preventing such a situation that in starting the vibration type actuator, a drive frequency becomes lower than a resonance frequency to stop an operation of the vibration type actuator.

According to the present invention, the foregoing object is attained by providing a vibration type actuator drive controller for controlling a drive speed of a vibration type actuator adapted to excite a vibration member by applying an A.C. signal to an electromechanical energy transducer to obtain a drive force, the vibration type actuator drive controller including:

an encoder for outputting a pulse signal having a period adapted to change in correspondence to the drive speed of the vibration type actuator;

a counter for carrying out up-count from a first value to a second value larger than the first value at predetermined time intervals while the vibration type actuator is accelerated;

clock output means for outputting a clock signal having a frequency corresponding to a count value of the counter;

measurement means for measuring the period of the pulse signal outputted from the encoder by counting clock pulses of the clock signal outputted from the clock output means; and control means for controlling the drive speed of the vibration type actuator so that the period of the pulse signal measured by the measurement means becomes a predetermined target value.

According to the present invention, the foregoing object is attained by providing the above vibration type actuator drive controller which further includes a plurality of logic circuits, in which the plurality of logic circuits are a synchronous circuit adapted to operate in accordance with an identical clock signal.

The invention is particularly advantageous since in the acceleration operation and the deceleration operation of the vibration type actuator, the speed is changed in fine steps while the acceleration is fixed, and hence the operation of the vibration type actuator can be smoothly carried out.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of invention.

DETAILED DESCRIPTION OF THE PREFERRED EMBODIMENTS

Preferred embodiments of the present invention will hereinafter be described in detail with reference to the accompanying drawings.

First Embodiment

Figure 2:
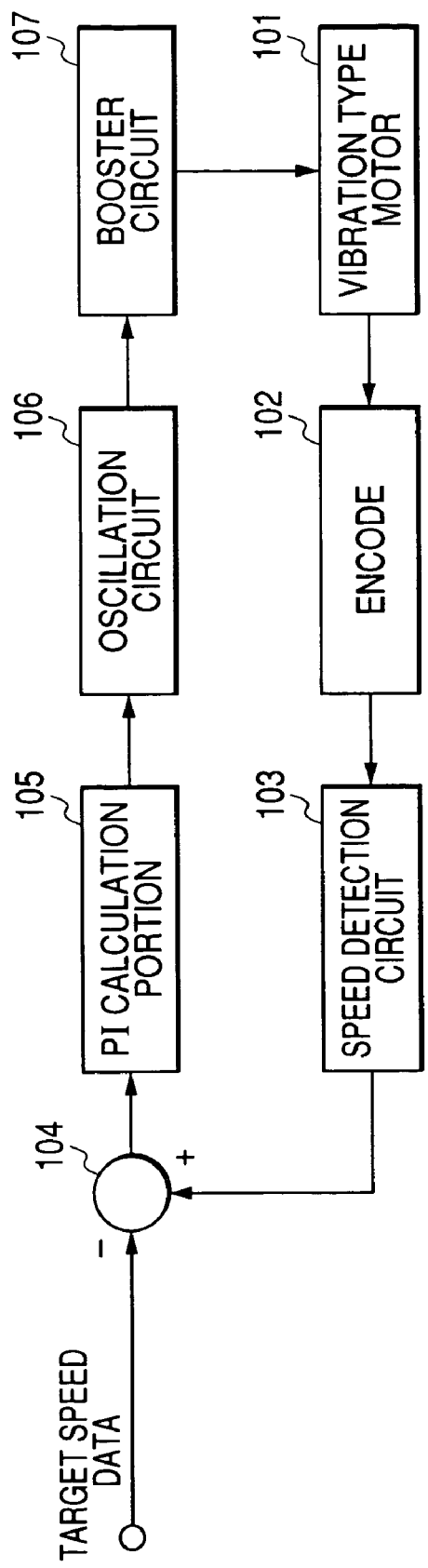
FIG. 2 is a block diagram showing a configuration of a circuit for controlling a vibration type motor according to the first embodiment of the present invention.

FIG. 2 is a block diagram showing a configuration of a circuit for controlling a vibration type motor as a vibration type actuator drive controller according to a first embodiment of the present invention.

Referring to FIG. 2, reference numeral 101 designates a vibration type motor. While not illustrated in FIG. 2, the vibration type motor 101 includes an electromechanical energy transducer, a vibration member, a movable member and the like. Then, the vibration type motor 101 is a motor having a configuration in which A.C. voltages of two phases are applied to the electromechanical energy transducer to generate a progressive vibration wave in the vibration member, and resultant vibration energy is transmitted to the movable member brought into pressure contact with the vibration member.

A rotary encoder 102 is mounted to an output shaft of the vibration type motor 101. A pulse signal having a frequency which is proportional to a drive speed of the vibration type motor 101 is outputted from the rotary encoder 102. Consequently, a drive speed of the vibration type motor 101 can be detected by measuring the frequency or a period of the pulse signal outputted from the rotary encoder 102.

Reference numeral 103 designates a speed detection circuit. While a detailed internal operation of the speed detection circuit will be described later, in this embodiment, according to a method including detecting a drive speed, the drive speed of the vibration type motor 101 is detected by measuring the period of the pulse signal outputted from the rotary encoder 102.

Reference numeral 104 designates a subtracter for calculating as speed deviation data a difference between speed data obtained from the speed detection circuit 103 and target speed data inputted from the outside.

Reference numeral 105 designates a proportional-plus-integration (PI) calculation portion for carrying out calculation for proportional-plus-integration based on the speed deviation data calculated in the subtracter 104. That is, the PI calculation portion 105 adds up a value which is obtained by multiplying the speed deviation data by a proportional gain, and a value which is obtained by multiplying an integral value of the speed deviation data by an integral gain to determine data of the operation amount used to make variable the drive speed of the vibration type motor 101. Moreover, the PI calculation portion 105 adds a predetermined offset value to the data of the operation amount to thereby determine a drive frequency of the vibration type motor 101. The vibration type motor 101 does not normally operate unless the drive frequency is a frequency which corresponds to the vicinity of a natural frequency of the vibration member as a constituent element of the vibration type motor 101 and which is equal to or higher than the natural frequency. Thus, the predetermined offset value is set to a value so that the drive frequency is higher than the natural frequency.

Reference numeral 106 designates an oscillation circuit for generating a pulse signal based on the drive frequency the data of which is sent from the PI calculation portion 105.

Reference numeral 107 designates a booster circuit having a transformer. The booster circuit 107 serves to operate the transformer at a timing of the pulse signal sent from the oscillation circuit 106 to generate a high voltage pulse which is boosted up to a voltage with which the vibration type motor 101 can be sufficiently driven, supplying the high voltage pulse thus generated to the vibration type motor 101.

In the drive circuit configured as described above, the vibration type motor 101 is controlled in a feedback style such that the drive speed of the vibration type motor 101 agrees with a target speed.

Figure 1:
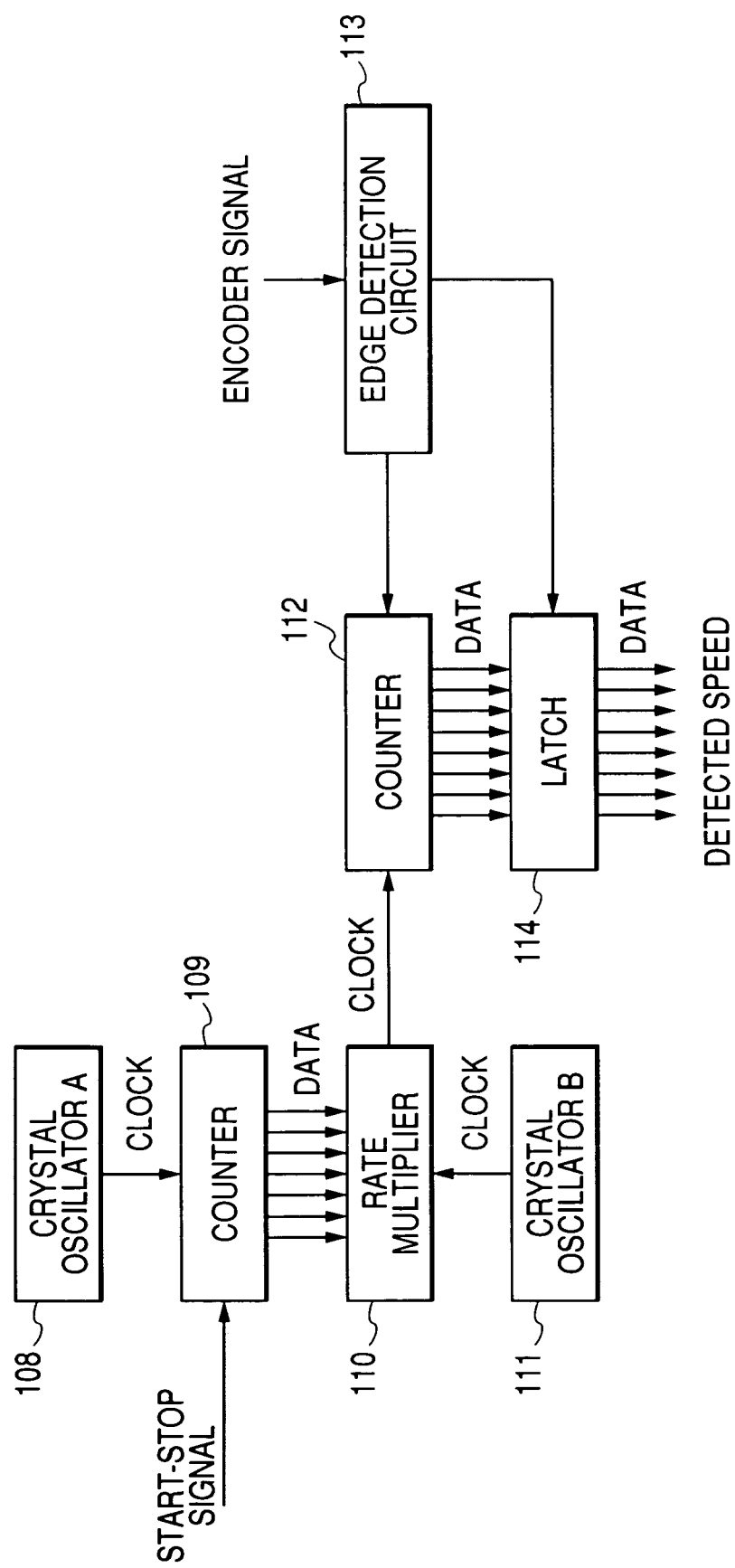
FIG. 1 is a block diagram showing an internal configuration of a speed detection circuit according to a first embodiment of the present invention.

FIG. 1 is a block diagram showing an internal configuration of the speed detection circuit 103 according to the first embodiment of the present invention. Note that, with a conventional speed detection circuit, a period of a pulse signal outputted from a rotary encoder is measured by counting a clock signal having a fixed frequency, and a drive speed of the vibration type motor is recognized based on the measurement results.

Referring now to FIG. 1, reference numeral 109 designates an updown counter for carrying out an up-count operation and a down-count operation based on a clock signal having a fixed frequency outputted from a crystal oscillator A 108. During stop of the vibration type motor 101, the count data of the updown counter 109 is held at zero. While details will be described later, when a start-stop signal at a high level is inputted from the outside to the updown counter 109 so as to start the operation of the vibration type motor 101, the updown counter 109 carries out an operation for up-count from zero to 255 as an acceleration operation. When a count value (count data) of the updown counter 109 becomes 255, the acceleration operation is completed, and the updown counter 109 holds the count value of 255.

The count data of the updown counter 109 is inputted in the form of rate data as binary data of 8 bits to a rate multiplier 110. The rate multiplier 110 has a function for outputting a pulse signal having a frequency determined in correspondence to the rate data. The frequency of the pulse signal outputted from the rate multiplier 110 is expressed by Equation (1):

$$\text{output frequency} = M \times f1/2^n \quad (1)$$

where M is a value which is obtained by converting the binary data inputted from the updown counter 109 to the rate multiplier 110 into a decimal number, f1 is a frequency of the clock signal having the fixed frequency inputted from a crystal oscillator B 111 to the rate multiplier 110, and n is the number of bits of the binary data inputted from the updown counter 109 to the rate multiplier 110.

The rate multiplier 110 used in this embodiment is configured so as to receive as its input the binary data of 8 bits from the updown counter 109. Hence, the frequency of the pulse signal outputted from the rate multiplier 110 falls within a range of 1/256 to 255/256 of the frequency f1 of the clock signal outputted from the crystal oscillator B 111, and thus has such a fine resolution as to be 1/256 of the frequency f1 of the clock signal outputted from the crystal oscillator B 111. Note that, it is supposed that the frequency f1 of the clock signal outputted from the crystal oscillator B 111 is higher than that of the clock signal outputted from the crystal oscillator A 108.

A pulse signal having a variable frequency outputted from the rate multiplier 110 is inputted as the clock signal to a counter 112.

Reference numeral 113 designates an edge detection circuit. The edge detection circuit 113 is configured so as to receive as its input the pulse signal (encoder signal) from the rotary encoder 102 to detect a leading edge of the encoder signal.

When the edge detection circuit 113 detects the leading edge of the encoder signal, the resultant detection signal is sent to both the counter 112 and a latch 114. Whenever the counter 112 receives the detection signal from the edge detection circuit 113, the counter 112 clears the count value until that time to zero, and starts to count the pulse signal (clock pulses) outputted from the rate multiplier 110. Also, whenever the latch 114 receives as its input the detection signal from the edge detection circuit 113, the latch 114 reads out the count value of the counter 112 before the clearing operation to hold the count value thus read out.

Consequently, the counter 112 counts the pulse signal (clock pulses) outputted from the rate multiplier 110 for a time period ranging from a leading edge to a next leading edge of the encoder signal, i.e., over one period of the encoder signal. The count value is then held by the latch 114 to be outputted as the speed data to the subtracter 104.

As can be seen from the above description, the speed data outputted from the speed detection circuit 103 of this embodiment corresponds to the number of clock pulses which are outputted for one period of the encoder signal from the rate multiplier 110. The number of clock pulses changes in correspondence to the drive speed of the vibration type motor 101, and also changes in correspondence to the frequency of the clock signal outputted from the rate multiplier 110. That is, the speed data outputted from the speed detection circuit 103 has a smaller value (an inverse number of the speed) as the drive speed of the vibration type motor 101 increases. However, the value of the speed data right after the start-stop signal at a high level is inputted starts with a small value even if the drive speed of the vibration type motor 101 does not change, and gradually increases whenever the clock signal is outputted from the crystal oscillator A 108.

Next, a detailed description will hereinafter be given with respect to an operation of the vibration type motor 101 during the acceleration operation.

Target speed data inputted to the subtracter 104 shown in FIG. 2 is set based on the speed of the vibration type motor 101 after completion of the acceleration operation. That is, since the count value (count data) of the updown counter 109 becomes 255 after completion of the acceleration operation, the frequency of the pulse signal outputted from the rate multiplier 110 as the input clock signal to the counter 112 becomes 255/256 of the frequency of the clock signal outputted from the crystal oscillator B 111. Thus, when the frequency of the crystal oscillation B 111, as described above, is assigned f1, and the frequency of the clock signal outputted from the rotary encoder 102 at the target speed is assigned f2, the value set as the target speed data is expressed by Equation (2):

$$\text{target speed data} = f1 \times (255/256)/f2 \quad (2)$$

The value of the target speed data is invariable during the deceleration operation as well as the acceleration operation.

As described above, during the acceleration operation, the count value of the updown counter 109 increases from zero to 255 at a timing of output of the clock signal from the crystal oscillator A 108. Hence, the frequency of the pulse signal which is outputted from the rate multiplier 110 to be used to measure the period of the rotary encoder 102 gradually increases. In this case, even if the target speed data is held constant, the control is carried out so that the frequency of the encoder signal outputted from the rotary encoder 102 becomes a frequency expressed by Equation (3):

$$\text{frequency} = f2 \times (i/256) \tag{3}$$

where i is the count value of the updown counter 109. The count value i increases every lapse of a fixed time period. Thus, the control is carried out such that the frequency of the encoder signal outputted from the rotary encoder 102 increases by the constant amount. As a result, the drive speed of the vibration type motor 101 is accelerated at a uniform acceleration.

Since when the count value of the updown counter 109 reaches 255, the count value of 255 is held as it is, the speed of the vibration type motor 101 becomes a constant speed, and hence the operation for accelerating the vibration type motor 101 is completed.

Next, a description will hereinafter be given with respect to an operation for decelerating the vibration type motor 101.

When the deceleration operation is started after completion of the acceleration operation, the count value of the updown counter 109 is held at 255. A deceleration command is issued in the form of input of the start-stop signal at a low level from the outside to the vibration type motor 101. The updown counter 109 having received as its input the start-stop signal at the low level carries out the down-count operation with the clock signal from the crystal oscillator A 108. When the count value reaches from 255 to zero, the updown counter 109 holds the count value of zero.

While the updown counter 109 carries out the down-count operation, the value of i expressed in Equation (3) decreases from 255 to zero at equal time intervals. Hence, the control is carried out such that the frequency of the encoder signal outputted from the rotary encoder 102 decreases by the constant amount. As a result, the vibration type motor 101 decelerates at uniform acceleration. Note that concurrently with completion of the deceleration operation, the supply of the drive voltage to the vibration type motor 101 is also stopped.

In addition, when the operation for decelerating the vibration type motor 101 is required while the operation for accelerating the vibration type motor 101 is carried out, the count value of the updown counter 109 in the middle of the acceleration operation is down-counted after this. As a result, even when the operation for the vibration type motor 101 is shifted from the acceleration operation to the deceleration operation, the speed of the vibration type motor 101 is prevented from being abruptly changed at the turn of the operation. Thus, the stable operation can be carried out for the vibration type motor 101. It should be noted that when it is unnecessary to decelerate the speed of the vibration type motor 101 down to zero while the vibration type motor 101 is decelerated, the deceleration operation for the vibration type rotor 101 is stopped after the count value of the updown counter 109 is down-counted to a predetermined value.

As described above, in this embodiment, each of the acceleration operation and the deceleration operation can be carried out through the fine steps having 255 stages using the inexpensive logic circuit as shown in FIG. 1. As a result, the vibration type motor 101 can be smoothly accelerated and decelerated. In addition, it is possible to prevent such a situation that in starting the vibration type motor 101, the drive frequency of the vibration type motor 101 is controlled to become a frequency lower than the natural frequency (resonance frequency) of the vibration member to stop the operation for driving the vibration type motor 101. In general, a drive frequency region where the drive frequency is lower than the resource frequency has characteristics in which the merely slight reduction of the drive frequency abruptly reduces the drive speed of the vibration type motor. Thus, though the start response of the vibration type motor 101 is delayed in starting the vibration type motor 101, if it is judged that the drive frequency is higher than the resonance frequency and the drive frequency is reduced to increase the drive speed, drive of the vibration type motor 101 may be stopped. However, in this embodiment, the operation for the vibration type motor 101 can be prevented from falling into such a situation.

Now, in this embodiment, during the acceleration operation and the deceleration operation, the value of the target speed data is not changed, but the frequency of the clock signal used to measure the period of the encoder signal is changed to thereby control the drive speed of the vibration type motor 101. The reason that such a control is carried out is to avoid the following situation. If the target speed data is changed by the constant amount since the target speed data set in the control circuit used in this embodiment is actually a value proportional to an inverse number of the speed, the actual drive speed of the vibration type motor 101 changes inversely proportional to a change in target speed data. Hence, a time period required to start the vibration type motor 101 is lengthened due to the small acceleration on the low speed side, whereas the acceleration excessively increases on the high speed side so that the control operation becomes unstable.

In addition, for detection of the amount proportional to the drive speed of the vibration type motor 101, a method is known including counting the number of pulses generated at fixed time intervals from the rotary encoder 102. In this case, however, when the speed information is intended to be obtained with high resolution, it is necessary to increase the number of output pulses per rotation of the rotary encoder 102, and hence there arises a necessity for using an expensive encoder.

In addition, a method is known in which after the period of the rotary encoder 102 is measured as in this embodiment, an inverse number of the measured value is calculated by a microcomputer or the like to convert the resultant inverse number into the amount proportional to the drive speed. In this case as well, however, an expensive constituent element such as a microcomputer is required.

Note that, in this embodiment, the two crystal oscillators A 108 and B 111 are used as means for generating two reference clock signals. However, alternatively, any of oscillators other than the crystal oscillator may be used, and moreover two clock signals having different periods may be generated from one oscillator to be used instead of the above-mentioned two reference clock signals.

In addition, each of the updown counter 109 and the rate multiplier 110 of this embodiment is of the 8 bit type. However, the number of bits may be changed in correspondence to an application, or each of the updown counter 109 and the rate multiplier 110 may be constituted by an application specific integrated circuit (ASIC), a gate array and the like as long as the same function as that of the foregoing is obtained.

Moreover, in this embodiment, in the control for the vibration type motor 101, the drive speed is controlled by managing the drive frequency. However, another parameter such as amplitude of the drive voltage or a phase difference in drive voltage with which the drive speed of the vibration type motor can be changed may also be used instead of the drive frequency. In addition, while the PI control is used for the control of the speed of the vibration type motor 101, alternatively, any other control method such as proportional-integral-derivative (PID) control may also be used.

In addition, in the normal speed control, a deviation between the target speed and the actual speed is detected, and the feedback control is carried out based on the detected deviation. In this embodiment, however, the amount proportional to a ratio of the target speed to the actual speed is calculated, and the feedback control is carried out based on the calculated amount. In a case of the feedback control in this embodiment, even if the speed deviation of the high speed side is the same as that of the low speed side, the speed deviation on the low speed side is managed more largely than that on the high speed side.

Figure 6:
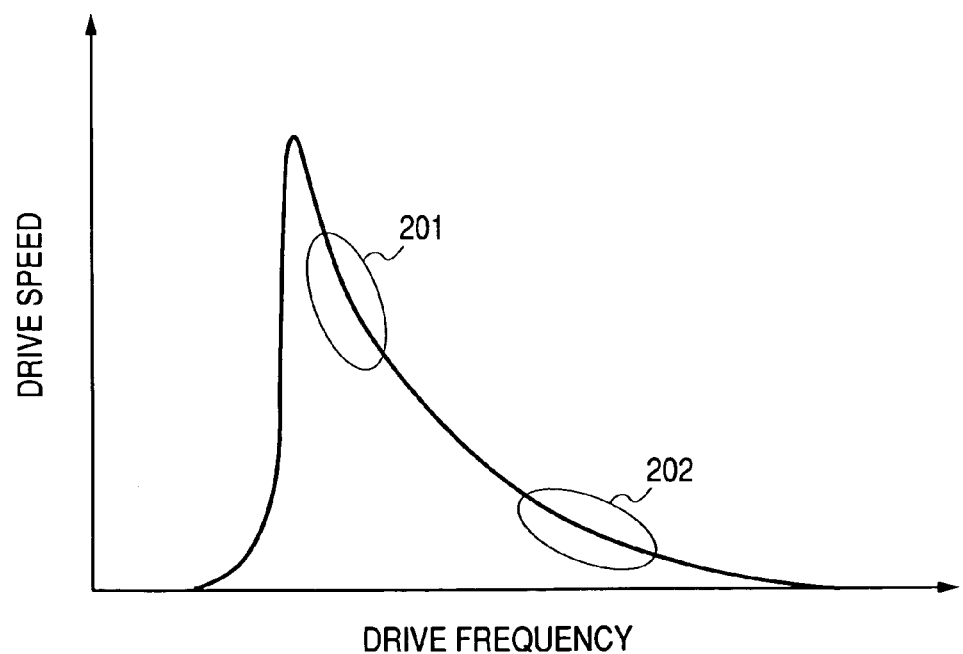
FIG. 6 is a graphical representation showing a relationship between a drive frequency and a drive speed of a vibration type motor.

On the other hand, in a case of the vibration type motor using the resonance phenomenon, a relationship between the drive frequency and the drive speed shows the characteristics of FIG. 6. That is, as shown in FIG. 6, a gradient of the drive speed with respect to the drive frequency becomes small on the low speed side of the drive speed (a zone 202) and becomes large on the high speed side of the drive speed (a zone 201). Consequently, such characteristics of the vibration type motor, and a difference in way of managing the speed deviation between the high speed side and the low speed side in this embodiment are complementary to each other. As a result, even if the feedback gain on the high speed side does not bother to be made different from that on the low speed side, in this embodiment, the feedback control stable in the wide drive speed region can be realized for the vibration type motor.

Consequently, in the controller for controlling the drive speed of the vibration type motor by changing the drive frequency, a case where the feedback control is carried out based on a ratio of the actual speed to the target speed becomes more advantageous than a case where the feedback control is carried out based on the speed deviation as carried out in the normal speed control. Thus, this embodiment contributes to the stabilization as well for such control.

Second Embodiment

Figure 3:
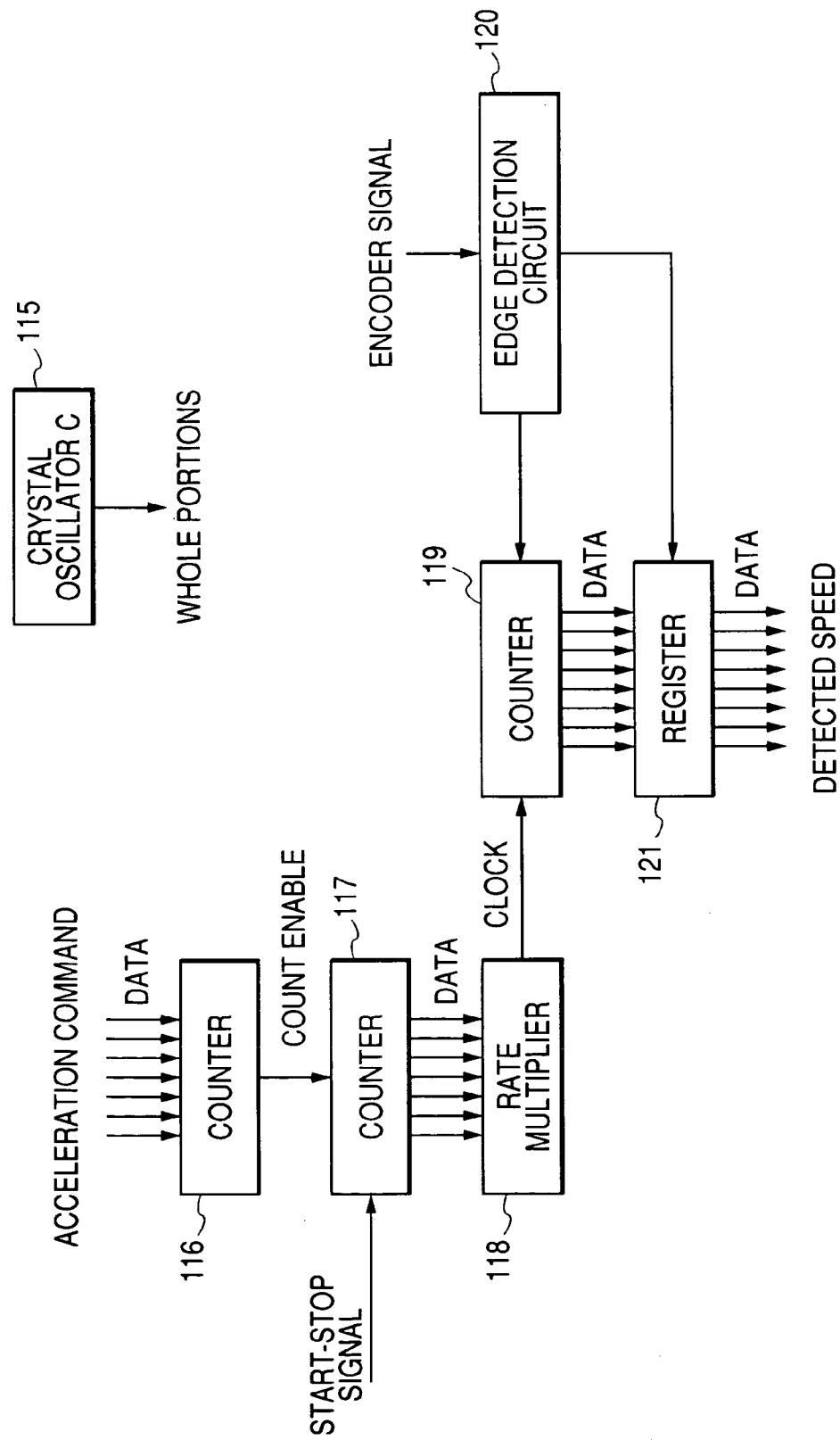
FIG. 3 is a block diagram showing an internal configuration of a speed detection circuit according to a second embodiment of the present invention.

FIG. 3 is a block diagram showing a configuration of a speed detection circuit according to a second embodiment of the present invention. Note that since a configuration of the circuit for controlling the vibration type motor according to the second embodiment is basically the same as that of the circuit for controlling the vibration type motor according to the first embodiment shown in FIG. 2, its description is omitted here for the sake of simplicity, and only the speed detection circuit as a constituent element different from that of the first embodiment is described below.

In the circuit for controlling the vibration type motor in the second embodiment, a clock signal is supplied from a crystal oscillator C 115 to all the constituent elements of this control circuit, and hence all the constituent elements operate synchronously with this clock signal.

Referring now to FIG. 3, reference numeral 116 designates a down counter. A value of an acceleration command issued from the outside is loaded into the down counter 116. Then, the down counter 116 carries out the down-count based on the clock signal inputted from the crystal oscillator C 115, and outputs a signal at a high level to the updown counter 117 when the count value becomes zero. Also, the acceleration command is loaded into the down counter 116 again. That is, the down counter 116 operates as a ring counter having a time period proportional to a value of an acceleration command as a period.

The high-level signal outputted from the down counter 116 is inputted in the form of a count enable signal to the updown counter 117. Only while the count enable signal is held at a high level, the updown counter 117 carries out either the up-count operation or down-count operation based on the clock signal outputted from the crystal oscillator C 115. That is, the updown counter 117 carries out the up-count operation during the acceleration operation in which the start-stop signal is at a high level, and carries out the down-count operation during the deceleration operation in which the start-stop signal is at a low level.

A rate multiplier 118, an edge detection circuit 120 and a counter 119 carry out basically the same operations as those of the rate multiplier 110, the edge detection circuit 113 and the counter 112 in the first embodiment except that the rate multiplier 118, the edge detection circuit 120 and the counter 119 operate synchronously with the clock signal outputted from the crystal oscillator C 115.

Note that, in this embodiment, a register 121 is used instead of the latch 114 used in the first embodiment because the overall control circuit is a synchronous circuit. Then, the register 121 carries out the same operation as that of the latch 114 in the first embodiment in respect that the register 121 receives as its input a count value of the counter 119 at a timing of a leading edge of an encoder signal to hold the count value as it is.

Adoption of the above-mentioned configuration allows the same effects as those of the first embodiment to be obtained in this embodiment as well. In addition thereto, since a timing at which the value of the rate data inputted to the rate multiplier 118 changes can be arbitrarily set in accordance with the value of the acceleration command issued to the down counter 116, it becomes possible to arbitrarily set the amount corresponding to the acceleration during the acceleration operation and the deceleration operation. That is, for example, if the value of the acceleration command issued to the down counter 116 becomes large, the speed at which the count value of the updown counter 117 changes in starting and accelerating the vibration type motor 101 becomes slow, and the speed at which the frequency of the clock signal outputted from the rate multiplier 118 increases also becomes slow. Consequently, the value of the acceleration command issued to the down counter 116 is made large to thereby allow the acceleration during the acceleration operation to be set low.

In addition, since in this embodiment, the control circuit shown in FIG. 3 is configured in the form of the synchronous circuit, when the circuit is configured using the ASIC, the gate array and the like, it is possible to realize the highly reliable circuit which is easy to be verified.

Third Embodiment

In a third embodiment, a description will be given to a color image forming apparatus in which the circuit for controlling a vibration type motor of the present invention is installed.

Figure 4:
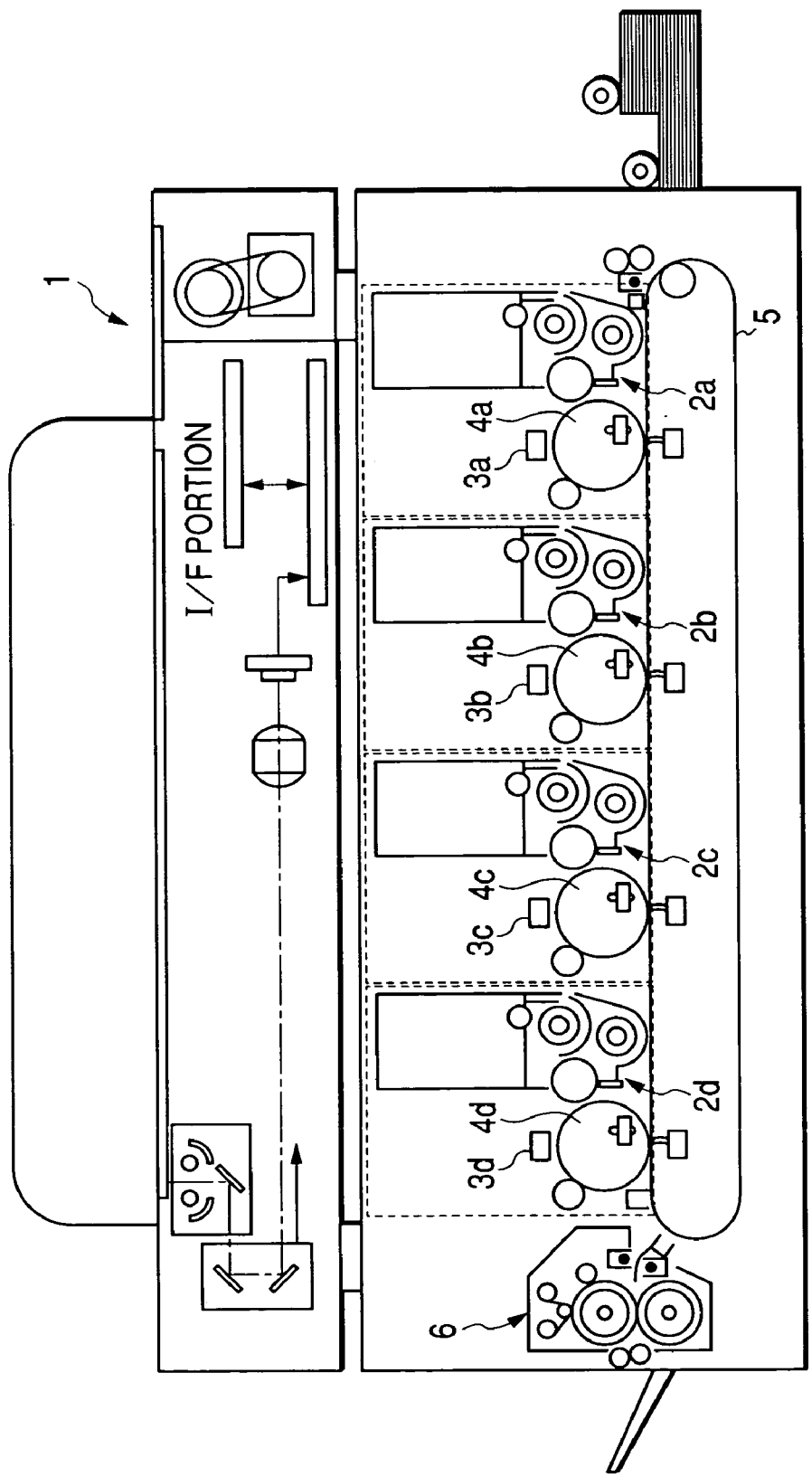
FIG. 4 is a front view showing a construction of a color image forming apparatus according to a third embodiment of the present invention.

FIG. 4 is a front view showing a construction of the color image forming apparatus according to the third embodiment of the present invention.

Referring to FIG. 4, reference numeral 1 designates a reader portion for reading information of an original. Reference symbols 2a, 2b, 2c and 2d designate image forming portions which are constituted by LED arrays 3a, 3b, 3c and 3d, photosensitive drums 4a, 4b, 4c and 4d, and the like, respectively. An image read by the reader portion 1 is developed in the photosensitive drums 4a, 4b, 4c and 4d. A yellow color, a magenta color, a cyan color, and a black color of the image captured by the reader 1 are developed in the image forming portions 2a, 2b, 2c and 2d, respectively. These four colors are composited to allow the full color copy to be carried out. Reference numeral 5 designates a transferring belt for conveying a recording paper. Toners of the respective colors are transferred onto the recording paper while the recording paper is conveyed by the transferring belt 5 to pass through the image forming portions 2a, 2b, 2c and 2d. Reference numeral 6 designates a fixing unit for fixing the toners transferred onto the recording paper using built-in fixing rollers which are being heated.

In the color image forming apparatus having the construction as described above, the nonuniformity of the rotation speeds of the photosensitive drums 4a, 4b, 4c and 4d in the respective image forming portions 2a, 2b, 2c and 2d, and the nonuniformity of the moving speed of the transferring belt 5 exert a large influence on the printing quality. Then, in this embodiment, the vibration type motors and the control circuit of the present invention are used for the drive of the photosensitive drums 4a, 4b, 4c and 4d, and for the drive of the transferring belt 5. Since the vibration type motor generates a large torque during the low speed drive, the direct drive can be readily carried out, and hence the highly accurate driving can be realized.

Figure 5:
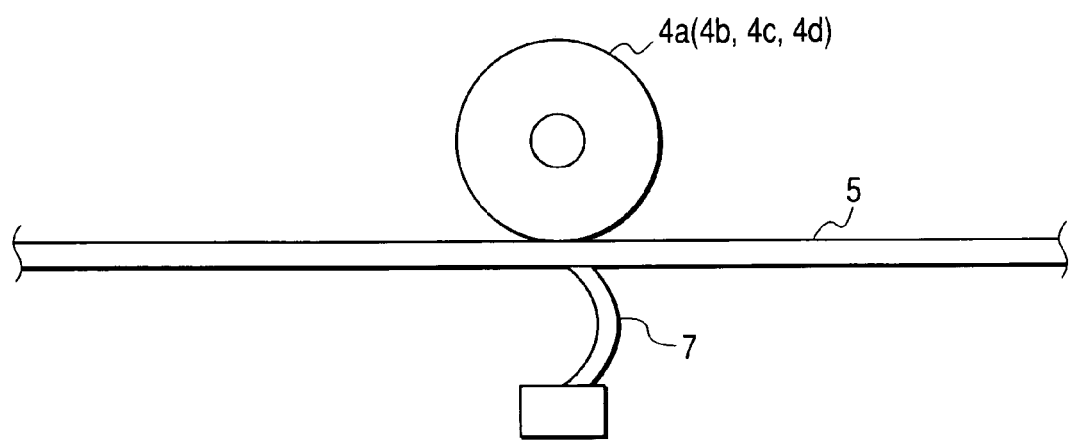
FIG. 5 is an enlarged view showing a photosensitive drum and a transferring belt in the color image forming apparatus shown in FIG. 4.

FIG. 5 is an enlarged view of the photosensitive drum 4a and the transferring belt 5 in the above-mentioned image forming apparatus. While only the photosensitive drum 4a is given as an example in FIG. 5, this situation is also applied to each of the photosensitive drums 4b, 4c and 4d.

The photosensitive drum 4a and the transferring belt 5 are pressed against each other by a blade 7 having resiliency. Thus, when slip occurs in a contact point between the photosensitive drum 4a and the transferring belt 5 due to the speed difference between the photosensitive drum 4a and the transferring belt 5, the photosensitive drum 4a is damaged by the friction. For this reason, it is necessary to prevent the speed difference from being generated in the contact point between the photosensitive drum 4a and the transferring belt 5 during the acceleration operation and the deceleration operation for the photosensitive drum 4a and the transferring belt 5 as well as during the image formation process. This is also applied to each of contact points between the photosensitive drums 4b, 4c and 4d, and the transferring belt 5.

In this embodiment, the acceleration operations and the deceleration operations for the vibration type motors as a drive source for the photosensitive drums 4a, 4b, 4c and 4d, and the transferring belt 5 are carried out using the drive circuit in the first or second embodiment as described above.

Consequently, since all the vibration type motors are driven at the same speed during the deceleration operation as well as the acceleration operation, the photosensitive drums 4a, 4b, 4c and 4d are prevented from being damaged.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is be understood that the invention is not limited to the specific embodiments thereof except as defined in the appended claims.

This application claims priority from Japanese Patent Application Nos. 2003-309245 filed Sep. 1, 2003 and 2004-196912 filed Jul. 2, 2004, both of which are hereby incorporated by reference herein.

What is claimed is:

1. A vibration type actuator drive controller for controlling a drive speed of a vibration type actuator adapted to excite a vibration member by applying an A.C. signal to an electromechanical energy transducer to obtain a drive force, comprising:
   an encoder which outputs a pulse signal having a period adapted to change in correspondence to the drive speed of the vibration type actuator;
   a counter which carries out up-count from a first value to a second value larger than the first value at predetermined time intervals while the vibration type actuator is accelerated;
   clock output unit which outputs a clock signal having a frequency corresponding to a count value of the counter;
   measurement unit which measures the period of the pulse signal outputted from the encoder by counting clock pulses of the clock signal outputted from the clock output unit; and
   control unit which controls the drive speed of the vibration type actuator such that the period of the pulse signal measured by the measurement unit becomes a predetermined target value.

2. A vibration type actuator drive controller according to claim 1, wherein the counter carries out down-count from the second value to a predetermined value smaller than the second value at predetermined time intervals while the vibration type actuator is decelerated.

3. A vibration type actuator drive controller according to claim 1, wherein when the vibration type actuator is instructed to be decelerated while the vibration type actuation is accelerated and the count value of the counter is a third value between the first value and the second value, the counter carries out down-count from the third value to a predetermined value smaller than the third value at predetermined time intervals.

4. A vibration type actuator drive controller according to claim 1, wherein the clock output unit comprises a rate multiplier adapted to have the count value of the counter as rate data.

5. A vibration type actuator drive controller according to claim 1, further comprising:
   timing control unit which controls a timing at which the counter is operated in accordance with an external command.

6. A vibration type actuator drive controller according to claim 5, wherein the timing control unit comprises a ring counter having a value of the external command as its period.

7. A vibration type actuator drive controller according to claim 1, further comprising a plurality of logic circuits, wherein the plurality of logic circuits are a synchronous circuit adapted to operate in accordance with an identical clock signal.

8. A vibration type actuator drive controller according to claim 1, wherein the control unit controls the drive speed of the vibration type actuator by changing a frequency of the A.C. signal applied to the electromechanical energy transducer.

9. A vibration type actuator drive controller according to claim 1, wherein the control unit controls the drive speed of the vibration type actuator by changing a voltage of the A.C. signal applied to the electromechanical energy transducer.

10. A vibration type actuator drive controller according to claim 1, wherein the control unit controls the drive speed of the vibration type actuator by changing a phase difference between the plurality of A.C. signals applied to the electromechanical energy transducer.

11. A method of controlling a drive speed of a vibration type actuator adapted to excite a vibration member by applying an A.C. signal to an electromechanical energy transducer to obtain a drive force, comprising:
   outputting a pulse signal having a period adapted to change in correspondence to the drive speed of the vibration type actuator;
   counting a count value by carrying out up-count from a first value to a second value larger than the first value at predetermined time intervals while the vibration type actuator is accelerated;
   outputting a clock signal having a frequency corresponding to the count value;
   measuring the period of the pulse signal by counting clock pulses of the clock signal; and
   controlling the drive speed of the vibration type actuator such that the period of the pulse signal becomes a predetermined target value.

12. A method of controlling a drive speed of a vibration type actuator according to claim 11, wherein the counting is conducted by carrying out down-count from the second value to a predetermined value smaller than the second value at predetermined time intervals while the vibration type actuator is decelerated.

13. A method of controlling a drive speed of a vibration type actuator according to claim 11, wherein when the vibration type actuator is instructed to be decelerated while the vibration type actuation is accelerated and the count value is a third value between the first value and the second value, the counting is conducted by carrying out down-count from the third value to a predetermined value smaller than the third value at predetermined time intervals.

14. A method of controlling a drive speed of a vibration type actuator according to claim 11, wherein the clock signal outputting is carried out by using a rate multiplier adapted to have the count value as rate data.

15. A method of controlling a drive speed of a vibration type actuator according to claim 11, further comprising:
   controlling a timing at which the count value is obtained in accordance with an external command.

16. A method of controlling a drive speed of a vibration type actuator according to claim 15, wherein the timing controlling is carried out by using a ring counter having a value of the external command as its period.

17. A method of controlling a drive speed of a vibration type actuator according to claim 11, wherein the method is implemented by using a plurality of logic circuits, and the plurality of logic circuits are a synchronous circuit adapted to operate in accordance with an identical clock signal.

* * * * *